US007940685B1

(12) United States Patent
Breslau et al.

(10) Patent No.: US 7,940,685 B1
(45) Date of Patent: May 10, 2011

(54) METHOD AND APPARATUS FOR MONITORING A NETWORK

(75) Inventors: Lee Michel Breslau, Basking Ridge, NJ (US); Christopher J. Chase, Austin, TX (US); William Christopher Fenner, Woodside, CA (US); Subhabrata Sen, New Providence, NJ (US)

(73) Assignee: AT&T Intellectual Property II, LP, Atlanta, GA (US)

( * ) Notice: Subject to any disclaimer, the term of this patent is extended or adjusted under 35 U.S.C. 154(b) by 905 days.

(21) Appl. No.: 11/280,645

(22) Filed: Nov. 16, 2005

(51) Int. Cl.
*H04L 12/26* (2006.01)

(52) U.S. Cl. ........ 370/251; 370/252; 370/390; 370/408; 709/224; 709/252

(58) Field of Classification Search .................. 370/241, 370/251, 253, 389, 392, 395.5, 401, 474, 370/475, 248, 247, 390, 407, 408, 252; 709/223, 709/224, 252; 726/15; 713/163; 714/47
See application file for complete search history.

(56) References Cited

U.S. PATENT DOCUMENTS

| 5,926,463 | A | 7/1999 | Ahearn | |
|---|---|---|---|---|
| 6,078,590 | A | 6/2000 | Farinacci | |
| 6,418,469 | B1 | 7/2002 | Justice, Jr. | |
| 6,718,382 | B1 * | 4/2004 | Li et al. | 709/224 |
| 6,768,737 | B1 | 7/2004 | Herzberg | |
| 6,779,051 | B1 * | 8/2004 | Basil et al. | 370/401 |
| 6,781,988 | B1 | 8/2004 | Gotoh | |
| 7,457,862 | B2 * | 11/2008 | Hepworth et al. | 709/224 |
| 2002/0174216 | A1 * | 11/2002 | Shorey et al. | 709/224 |
| 2003/0177221 | A1 * | 9/2003 | Ould-Brahim et al. | 709/223 |
| 2004/0015583 | A1 * | 1/2004 | Barrett et al. | 709/224 |
| 2006/0106866 | A1 * | 5/2006 | Green et al. | 707/104.1 |
| 2009/0168776 | A1 * | 7/2009 | Baum et al. | 370/390 |

OTHER PUBLICATIONS

Alchaal et al., "Offering a Multicast Delivery Service in a Programmable Secure IP VPN Environment", Network Group Communication (NGC'02), Boston, USA, Oct. 2002.*
Viger, "Active Probing with ICMP Packets", Jul. 14, 2003, University of Melbourne, all pages.*
Beverly, R.; Claffy, K.C., "Wide-area IP multicast traffic characterization," Network, IEEE , vol. 17, No. 1, pp. 8-15, Jan./Feb. 2003.*
al-Shaer et al., Journal of Network and Systems Management, vol. 10 Issue 3, Sep. 2002, pp. 357-381.*
Dressler, Proceedings of 10th International Conference on Telecommunication Systems, Modeling and Analysis (ICSTM10), 2002, pp. 671-678.*
Cottrell, "Throughput Versus Loss", Feb. 16, 2000, http://www.slac.stanford.edu/comp/net/wan-mon/thru-vs-loss.html.
Wikipedia, "Data Rate", Mar. 14, 2004, http://en.wikipedia.org/w/index.php?title=Data_rate&oldid=16180635.

(Continued)

*Primary Examiner* — Kwang B Yao
*Assistant Examiner* — Jeffrey M Rutkowski
(74) *Attorney, Agent, or Firm* — Akerman Senterfitt; Michael K. Dixon (57) ABSTRACT

Certain exemplary embodiments provide a method that can comprise establishing a tunnel between a monitor and at least one router; sending a message to join a multicast transmission; and/or transmitting a packet via the tunnel to a router. The packet can comprise a source address of the network monitor and a destination address comprising a multicast address.

20 Claims, 4 Drawing Sheets

OTHER PUBLICATIONS

Wikipedia, "Data Signaling Rate", Oct. 25, 2005, http://en.wikipedia.org/w/index.php?title=Data_rate&oldid=16180635.

Wikipedia, "End-to-End Delay", Nov. 3, 2005, http://en.wikipedia.org/w/index.php?title=End-to-end_delay&oldid=27223045.

Wikipedia, "IPv4", Oct. 17, 2005, http://en.wikipedia.org/w/index.php?title=IPv4&oldid=25763431.

Wikipedia, "Packet (information technology)", Oct. 18, 2005, http://en.wikipedia.org/w/index.php?title=Packet_(information_technology)&oldid=25854247.

Wikipedia, "Ping", Oct. 31, 2005, http://en.wikipedia.org/w/index.php?title=Ping&oldid=26987727.

* cited by examiner

METHOD AND APPARATUS FOR MONITORING A NETWORK

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DEFINITIONS

When the following terms are used substantively herein, the accompanying definitions apply:

a—at least one.
activity—an action, act, step, and/or process or portion thereof.
adapted to—capable of performing a particular function.
and/or—either in conjunction with or in alternative to.
apparatus—an appliance or device for a particular purpose.
associated—related to.
automatically—acting or operating in a manner essentially independent of external influence or control. For example, an automatic light switch can turn on upon "seeing" a person in its view, without the person manually operating the light switch.
backbone network—a "transit" network often made up of long-distance telephone trunk lines and/or other wired and/or wireless links such as microwave and satellite links for use in transmitting large amounts of data simultaneously between host computer systems connected to the Internet. Normal communicated data typically neither originates nor terminates in a backbone network.
calculate—compute.
can—is capable of, in at least some embodiments.
comprising—including but not limited to.
connectivity—an ability to make and maintain a connection between two or more information devices in a network.
copy—an imitation or reproduction of an original.
couple—to join, connect, and/or link together.
customer—a user of packet payload content.
Customer Edge router—a router in a customer network communicatively coupled to a Provider Edge router.
customer network packet—a packet originating from outside a backbone network.
data—distinct pieces of information, usually formatted in a special or predetermined way and/or organized to express concepts.
data loss problem—a condition or state resulting in a loss of packets transmitted via a network.
define—to establish the outline, form, or structure of.
delay—an elapsed time between two states and/or events.
destination address—a moniker associated with a place and/or entity to which a transmission is ultimately directed.
device—a machine, manufacture, and/or collection thereof.
egress—where traffic exits a network.
egress Provider Edge router—a last router in a provider network to receive a multicast packet.
end-to-end delay—an elapsed time during which a packet is being transmitted in a network.
establish—set up.
expected—predicted.
forward—to send on to and/or toward a subsequent destination and/or address.
Generic Route Encapsulation (GRE)—an unencrypted IP tunneling protocol, which sometimes serves as a foundation for other tunneling protocols, such as MPPE/PPTP. GRE tunnels provide a specific pathway across the shared WAN and encapsulate traffic with new packet headers to ensure delivery to specific destinations. The network is private because traffic can enter a tunnel only at an endpoint and can leave only at the other endpoint. GRE tunnels do not provide true confidentiality (like encryption does) but can carry encrypted traffic. GRE tunnels are logical endpoints configured on the physical interfaces through which traffic is carried.
identifier—a group of symbols that are unique to a particular entity, activity, and/or document. An identifier can be, for example, a medical record number. An identifier can be human and/or machine readable, such as for example, a number, an alphanumeric string, a bar code, an RFID, etc.
identify—recognize and/or detect.
information—processed, stored, and/or transmitted data.
information device—any device capable of processing information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can comprise components such as one or more network interfaces, one or more processors, one or more memories containing instructions, and/or one or more input/output (I/O) devices, one or more user interfaces coupled to an I/O device, etc.
ingress—where traffic enters a network.
ingress Provider Edge router—a first router in a provider network to receive a multicast packet.
input/output (I/O) device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

instructions—directions adapted to perform a particular operation or function.

Internet Control Message Protocol Echo Reply—a message, sent via a network, sent responsive to a request from an information device, the message sent according to the standard error and control message protocol for Internet systems defined in RFC 792.

Internet Control Message Protocol Echo Request—a message, sent via a network, requesting a response from an information device, the message sent according to the standard error and control message protocol for Internet systems defined in RFC 792.

Internet Group Management Protocol—an Internet protocol adapted to allow an information device to report a multicast group membership to an adjacent router defined in RFC 2236, RFC 1812 and RFC 1054.

join—to become a part of and/or renew a membership in a multicast group.

join message—a message sent by an information device to a router requesting membership in a multicast group, sent according to RFC 2236.

machine instructions—directions adapted to cause a machine to perform a particular operation or function.

machine readable medium—a physical structure from which a machine can obtain data and/or information. Examples include a memory, punch cards, etc.

maintain—to keep in an existing state.

manage—to direct or control.

may—is allowed and/or permitted to, in at least some embodiments.

membership—a state of being associated with an entity and/or a group of entities in a multicast group.

memory device—an apparatus capable of storing analog or digital information, such as instructions and/or data. Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein.

message—a communication.

method—a process, procedure, and/or collection of related activities for accomplishing something.

monitor—a device adapted to systematically check, test, and/or sample for the purpose of evaluating a statistic of a metric related to the performance of a system, network, routing entity, source, destination, etc.

Multicast Distribution Tree—a partially ordered hierarchical list of a plurality of routers, information devices, and/or links adapted to distribute multicast packets from a source to a plurality of destinations.

multicast group—a plurality of information devices, each of the plurality of information devices subscribing to a multicast.

multicast group address—a single address used to deliver packets to multiple network devices, thereby providing communication from a single sending device to multiple receiving devices. Receiving devices issue join messages for the multicast so that packets addressed to the multicast group are delivered to them.

Multicast Virtual Private Network (MVPN)—a service in which multiple edge networks attach to a backbone network at one or more locations, and in which IP multicast traffic sent from one edge location is delivered to one or more other edge locations by encapsulating the IP multicast traffic and transmitting it across the backbone network.

network—a communicatively coupled plurality of nodes.

interface—any device, system, or subsystem capable of coupling an information device to a network. For example, a network interface can be a telephone, cellular phone, cellular modem, telephone data modem, fax modem, wireless transceiver, ethernet card, cable modem, digital subscriber line interface, bridge, hub, router, or other similar device.

number—count.

obtain—to procure and/or receive.

one-way delay—an elapsed time for a transmission between a source information device and a destination information device.

packet—a discrete instance of communication.

packet loss rate—a frequency at which sent packets do not arrive at a destination information device.

performance metric—a measured and/or determined value of a variable related to conducting an activity.

ping—a utility to determine whether a specific IP address is accessible by sending a packet to the specific IP address and waiting for a reply.

plurality—the state of being plural and/or more than one.

predetermined—established in advance.

probe packet—one or more pre-identified and/or predetermined packets comprising information from a monitor.

processor—a device and/or set of machine-readable instructions for performing one or more predetermined tasks. A processor can comprise any one or a combination of hardware, firmware, and/or software. A processor can utilize mechanical, pneumatic, hydraulic, electrical, magnetic, optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein.

provide—to furnish and/or supply.

Provider Edge router—a device in a Provider network communicatively coupled to a device in a Customer network.

receive—accept something provided and/or given.

recording—storing information in a retrievable form.

relative—in comparison with.

render—make perceptible to a human, for example as data, commands, text, graphics, audio, video, animation, and/or hyperlinks, etc., such as via any visual, audio, and/or haptic means, such as via a display, monitor, electric paper, ocular implant, cochlear implant, speaker, etc.

repeatedly—again and again; repetitively.

response—a reaction to an influence and/or impetus.

retransmit—repeat a transmission.

return—to send directly or indirectly.

round trip delay—an elapsed time for a transmission from a bidirectional transmission between a first information device and a second information device.

router—a device adapted to direct traffic. Examples include a router, route-reflector, route server, server-based router, router-switch, sets of routers, and/or intra-networking devices, etc. A typical router operates at least at the bottom 3 layers (Physical, Link, and Network layers) of the OSI model.

send—to convey.

sending time—an elapsed time to convey.

set—a related plurality.

size—magnitude.

source address—a moniker associated with a place and/or entity from which a transmission is sent and/or forwarded.

store—to place, hold, and/or retain data, typically in a memory.

subsequent—following in time.

substantially—to a great extent or degree.

subtracting—determining a mathematical difference between two values.

system—a collection of mechanisms, devices, data, and/or instructions, the collection designed to perform one or more specific functions.

time—a measurement of a point in a nonspatial continuum in which events occur in apparently irreversible succession from the past through the present to the future.

total data rate—a measurement of a timed rate at which data flows through a network.

transmission—a conveyance of information from one location to another.

transmit—to convey information from one part of a information device to another.

tunnel—one or more paths followed by encapsulated packets, one or more connections over which packets are exchanged which carry the data of another protocol, and/or one or more virtual encrypted connections formed between two or more systems over a network, such as a backbone network.

unicast—a communication via a network between a single sender and a single receiver.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

via—by way of and/or utilizing.

virtual link—a communicative connection between a first information device and a second information device created, simulated, and/or carried on via a computer network.

DETAILED DESCRIPTION

Certain exemplary embodiments provide a method that can comprise establishing a tunnel between a monitor and at least one router; sending a message to join a multicast transmission; and/or transmitting a packet via the tunnel to a router. The packet can comprise a source address of the network monitor and a destination address comprising a multicast address.

Networks can be used in today's digital world to communicate information between end systems such as users, servers, and the like. Information is often transmitted in the form of IP (Internet Protocol) packets of digital data. Each IP packet typically has a header with the source IP address and port number, the destination IP address and port number, and other fields. The network is typically responsible for delivering the IP packets to their respective destinations. To perform this task, networks usually include routers for routing and transmitting the data packets.

A router can be connected to another router by a transmission link. The transmission link can connect a port on the first router to a port on the second router. All of the pairs of routers might not be connected and, conversely, there can be multiple links between any two given routers.

Detailed network traffic measurement in general can be both important and expensive. Measurements in VPNs (virtual private networks) in particular can be expensive since typically expensive measurement equipment is manually and physically deployed within a particular VPN. The equipment typically deployed in such situation can reach from active probing devices such as ping probes and/or application transaction simulators to passive devices such as traffic sniffers that can measure performance and/or security properties. The cost of deploying these devices can be even further compounded by the fact that in many cases the measurements only need to be performed for and/or during short periods of time, such as when a performance and/or security problem has been noticed by a user.

A VPN and/or a connection thereto can be logically formed on a physical network that can be and/or utilize any of a wide variety of networks, such as a circuit switched, public-switched, packet switched, data, telephone, telecommunications, video distribution, cable, terrestrial, broadcast, satellite, broadband, corporate, global, national, regional, wide area, backbone, packet-switched TCP/IP, Fast Ethernet, Token Ring, public Internet, private, ATM, multi-domain, and/or multi-zone network, and/or one or more Internet service providers, and/or one or more information devices, such as a switch, router, and/or gateway not directly connected to a local area network, etc.

Figure 1:
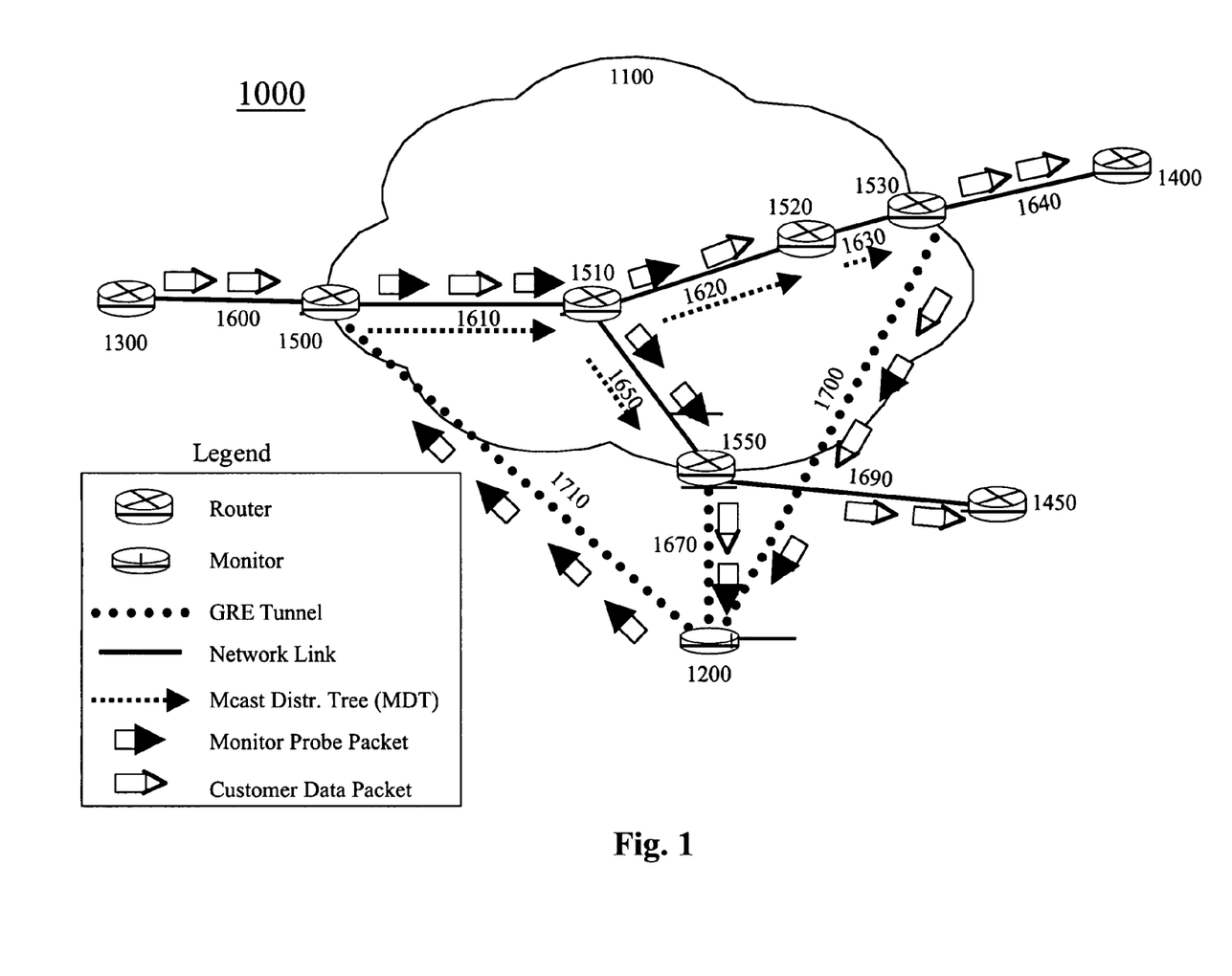
FIG. 1 is a side view of an exemplary embodiment of a system 1000.
Figure 4:
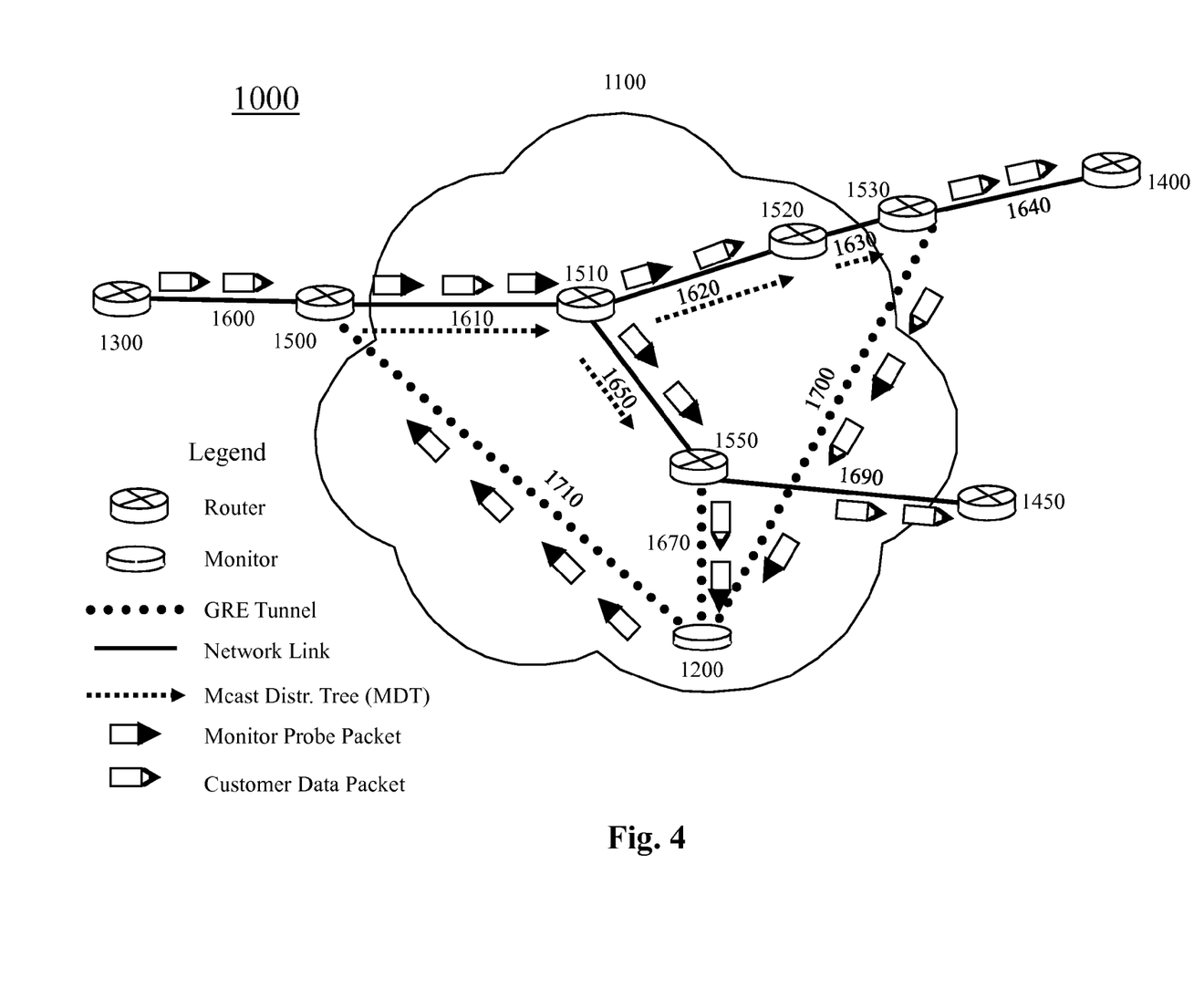
FIG. 4 is a side view of an exemplary embodiment of system 1000.

FIG. 1 is a side view of an exemplary embodiment of a system 1000 and FIG. 4 is a side view of an exemplary embodiment of system 1000, which can comprise a network 1100 adapted to receive a multicast transmission. In certain exemplary embodiments, network 1100 can be a backbone network.

In a conventional unicast transmission, a packet can be delivered from a single source to a single destination. By contrast, a multicast can deliver a packet from a single source to multiple destinations. Multicast packets can comprise a source Internet Protocol (IP) address of a sending host. Rather than identifying a single endpoint, a destination IP address comprised in a multicast packet can denote a multicast group address. Multicast group addresses can be taken from a reserved portion of the 32-bit IP address space and can identify a logical group and/or a specific set of logical locations.

End hosts that are interested in receiving packets sent to a particular multicast group, can "join" the multicast group. A multicast can be joined via a sent message and/or command conforming to the Internet Group Management Protocol (IGMP), in which end hosts can signal their interest in a group by sending a message to an adjacent router.

Routers can participate in a multicast routing protocol (Protocol Independent Multicast, or PIM, being the most common) to establish a per-group Multicast Distribution Tree (MDT) in the network. Multicast packets can be forwarded from the sender via routers comprised and/or defined by the MDT, and can be replicated as necessary at branching routers comprised in the tree. In this way, a single copy of each packet can be sent over any link in the network. In contrast, the same service could be provided with replicated unicast, where the source can send a separate copy of the packet to each interested receiver. But in this case, multiple copies of the same packet can traverse the same link. Multicasting can provide an efficient delivery mechanism.

Multicast packets can be encapsulated, such as via Generic Routing Encapsulation (GRE). Encapsulated multicast packets can be identified by each network router and distributed via routers comprised and/or defined by the MDT to routers in provider and/or customer networks to destination devices that have joined the multicast.

Multicast Virtual Private Networks (MVPNs) can extend the capabilities of conventional (point-to-point) Virtual Private Networks (VPNs) by allowing the customer to transmit multicast packets across the VPN. When a Provider Edge router (PE), such as PE routers 1500, 1530, 1550, receives a multicast packet from a Customer Edge router (CE), such as CE routers 1300, 1400, 1450, each PE router can encapsulate a customer multicast packet in a provider multicast packet. This provider multicast packet can be transmitted across the provider backbone over a multicast tree comprising PE and Provider (P) routers, such as P routers 1510, 1520. A PE router that receives a multicast packet over the provider multicast tree can decapsulate it, which can yield an original customer multicast packet. The customer multicast packet can be forwarded to adjacent CE routers if the CE routers are on the path to receivers who have joined the customer multicast group.

The distribution of multicast packets across the provider backbone can use conventional IP multicasting. In that case, the PE router that receives the multicast packet from the CE router 1300 can act as a sending host. PE routers 1500, 1530, 1550, to whom the encapsulated multicast packet is distributed, can be the receivers and can issue IGMP joins to ensure that they receive the encapsulated packets. The tree over which the encapsulated multicast packet is transmitted in the provider backbone can referred to as a Multicast Distribution Tree (MDT).

System 1000 can comprise a monitor 1200 adapted to monitor routers comprised and/or defined by the Multicast Distribution Tree (MDT) in the provider backbone that can be used to transport customer multicast traffic across the provider backbone in a Multicast VPN (MVPN). Monitor 1200 can be adapted to determine whether multicast packets are being received at various routers comprised and/or defined by the MDT including both interior P routers, and edge PE routers, and/or one or more performance metrics regarding such packets, such as what the packet loss rate between any two or more routers comprised and/or defined by the MDT is, what the delay in transmission rate is between any two or more routers comprised and/or defined by the MDT, and/or at what rate the customer is transmitting data over and/or between routers comprised and/or defined by the MDT, etc.

Monitor 1200 can comprise software deployed on a remote and/or central monitoring server (e.g., in a Network Operations Center) that can remotely interact with provider routers using standard protocols. Monitor 1200 can communicate with every routing entity within network 1100, as well as every provider network ingress point and/or egress point at PE routers 1500, 1530, 1550. Thus, monitor 1200 can know of the existence and network address of each routing entity, ingress point, and egress point of network 1100. Moreover, monitor 1200 can be physically and/or logically located within and/or outside (e.g., via tunneling) of network 1100.

A tunnel can be established into one or more of routers 1500, 1530, 1550 from monitor 1200. Via the tunnel, probes and/or packets can be transmitted between monitor 1200 and one or more of routers 1500, 1530, 1550.

Monitor 1200 can process received probes and/or packets in any of a wide variety of manners, potentially automatically, non-manually, in real-time, on demand, intermittently, dynamically, selectively, logically, remotely, and/or non-physically, etc. For example, the monitor can dynamically, selectively, and/or remotely measure, monitor, archive, predict, test, assess, trouble-shoot, report, adjust, correct, and/or repair, etc., received probes, received packets, network utilization, congestion, protocol compliance, QOS assignments, security compliance, and/or network and/or application performance, etc. As another example, monitor 1200 can dynamically insert active probes into and/or passively monitor network 1100, and/or any portion of the MDT. Monitor 1200 can process (e.g., measure, monitor, test, assess, etc., as listed above) a characteristic of at least a portion of the backbone network, a MVPN established over network 1100, any portion of the MDT, and/or at least a portion of the probes and/or probe packets. Monitor 1200 can provide a human user interface for any of its processes and/or functions, such as its measuring, monitoring, archiving, predicting, testing, assessing, trouble-shooting, reporting, adjusting, correcting, and/or repairing, etc., processes.

Monitor 1200 can communicate with PE and P routers over virtual links, which can make monitor 1200 appear to be directly connected to the routers in the multicast topology. These virtual links can be implemented using known networking technology, such as GRE encapsulation, IP-in-IP encapsulation, or Asynchronous Transfer Mode (ATM) Virtual Circuits. In a prototype implementation, each router can be configured to support a GRE tunnel between itself and monitor 1200. This virtual monitoring capability can be adapted to monitor routers comprised and/or defined by the MDTs on a large scale.

For example, CE router 1300 can be adapted to originate a MVPN transmission. Monitor 1200 can be adapted to send a join request for the MVPN transmission to PE routers 1500, 1530, 1550 across GRE tunnels 1710, 1670, 1700 that are defined between monitor 1200 and PE routers 1500, 1550, and 1530 respectively. The MDT associated with the MVPN transmission can comprise one or more of links 1610, 1620, 1630, 1650, 1670. Customer data packets associated with the MVPN transmission can be routed via any path comprising PE routers 1500, 1530, 1550; P routers 1510, 1520; and/or links 1600, 1610, 1620, 1630, 1640, 1650, 1670, 1690.

Determining with which routers monitor 1200 will establish virtual links can be learned from router configuration files, dynamically from routers (e.g., using SNMP queries), and/or from other configuration information, etc.

Monitor 1200 can operate in two modes: "active" and "passive." In active mode, monitor 1200 can transmit probe packets to routers comprised and/or defined by the MDT and monitor these packets. In passive mode, monitor 1200 might not transmit any packets to the routers comprised and/or defined by the MDT. Instead, monitor 1200 can be adapted to monitor packets sent by the customer and/or from outside the backbone network via routers comprised and/or defined by the MDT. Certain exemplary embodiments can monitor P routers in addition to PE routers, and/or can monitor multiple MDTs simultaneously.

Monitor 1200 can be adapted to send an IGMP join message for the group to each router comprised and/or defined in the MDT, such as P routers 1510, 1520; and/or PE routers 1500, 1530, 1550. In certain exemplary embodiments, all multicast packets addressed to the multicast group and received at a particular PE router will be forwarded and/or copied to monitor 1200. IGMP join messages can be periodically and/or aperiodically retransmitted by monitor 1200 to maintain a membership in the multicast group on each of the virtual links between monitor 1200 and each PE router comprised and/or defined in the MDT.

CE 1300 can inject a source address into a multicast packet, which can be routeable via a provider domain. Thus, multicast packets from CE 1300 can be routed properly across a provider backbone. A destination address of the packets can comprise and/or be comprised by a multicast group address associated with the MDT.

To inject probe traffic into routers comprised and/or defined by the MDT, monitor 1200 can transmit a multicast probe packet to an ingress router such as PE router 1500. The multicast probe packet can be transmitted to the PE router 1500 encapsulated in a unicast packet over the virtual link. Within the network 1100, the probe packet might not comprise multicast encapsulation such as GRE encapsulation. Thus, the probe packet might not be forwarded to a customer router, but rather can be adapted for communications with provider routers. The source address of probe packets can comprise an IP address that PE router 1500 can use to identify monitor 1200 in a virtual link between PE router 1500 and monitor 1200.

The size and frequency of probe packets transmitted by monitor 1200 to PE router 1500 can be a function of a desired output from monitor 1200 as well as network engineering. For example, sending probe packets every 10 seconds might be enough to provide a simple connectivity monitor (e.g., for determining whether traffic sent from PE router 1500 is actually received at P router 1510), whereas sending probe packets more frequently (e.g., every 100 ms) might be desirable to provide more detailed information about packet loss rate between, for example, PE router 1500 and receiver P router 1510. Statistical distributions (e.g., Poisson) can also be used to determine inter-packet time.

For each probe packet that monitor 1200 injects into the network, monitor 1200 can record a sending time of the packet, as well as the set of PE routers 1500, 1530, 1550 from which it expects to receive a copy of the packet (e.g., those to which it has issued an IGMP join for the multicast group). Each packet can comprise identifying information so that when that packet is subsequently received from each of PE routers 1500, 1530, 1550, monitor 1200 can identify which packet it is, and hence, its sending time.

In addition to sending multicast probe packets to PE router 1500, monitor 1200 can send periodic ping packets, such as Internet Control Message Protocol (ICMP) Echo Request packets, over virtual links to each of PE routers 1500, 1530, 1550. These ping packets can be sent via unicast, and the receiving router can immediately return an ICMP Echo Reply via unicast routing to monitor 1200 utilizing the ICMP protocol. Monitor 1200 can thereby monitor a packet loss rate and a round trip delay between monitor 1200 and each of PE routers 1500, 1530, 1550.

The multicast probe packets transmitted by monitor 1200 can be received by PE router 1500 and subsequently forwarded along the MDT established for each network device adapted to receive the group address. Multicast packets can be subject to conventional IP best-effort service, and hence can be subject to queuing delays in network 1100, as well as packet loss due to congestion and/or corruption. When the multicast packets addressed to the multicast group address are received at PE routers 1500, 1530, 1550, each PE router can be adapted to transmit and/or forward a copy across a virtual link to monitor 1200. Monitor 1200 might receive multiple copies of each probe packet it transmits, one from each of PE routers 1500, 1530, 1550 to which it issued an IGMP join for joining the multicast group. Address information in the probe packet or information provided by the virtual link technology can enable monitor 1200 to determine which of PE routers 1500, 1530, 1550 each copy of the probe packet was received from. For each probe packet received, monitor 1200 can record the router from which it was received as well as the time at which it was received.

When forwarding a multicast packet in the provider domain, PE routers 1500, 1530, 1550 might not distinguish between probe packets transmitted by monitor 1200 and actual customer traffic that was originally received in the provider domain from one of CE routers 1300, 1400, 1450. Thus, both artificial traffic (e.g., probe packets) injected by monitor 1200 and customer traffic will be forwarded to monitor 1200. Monitor 1200 can be adapted to differentiate between the two kinds of traffic based on identifying header information and can be adapted to discard the customer traffic (e.g., when operating in active mode) and/or the artificial traffic (e.g., when operating in passive mode). The operation of the MVPN protocol and/or address information comprised in each probe packet can enable the PE routers to not forward the artificial probe packets to CE routers 1300, 1400, 1450. Thus, the active probe traffic can be invisible to the customer, and the monitoring activity can transparent to the customer.

Using information collected related to probe packets, monitor 1200 can compute performance metrics, such as the loss rate and/or one-way delay between PE routers 1500, 1530, 1550. The end-to-end loss rate on paths from monitor 1200 to an ingress PE router, such as router 1500, through the MVPN to an egress PE router, such as router 1530 or 1550, and back to monitor 1200 can be determined directly from a percentage of packets transmitted to PE router 1500 from monitor 1200 that were not received back from PE routers, 1530, 1550. The loss on segments between monitor 1200 and PE routers 1500, 1530, 1550 of an end-to-end path can be determined utilizing a loss rate associated with unicast pings transmitted across the virtual links to PE routers 1500, 1530, 1550. Similarly, for one-way delay, delays can be removed that have been measured with the unicast pings from an end-to-end delay measured across paths between monitor 1200 and PE routers 1500, 1530, 1550.

Passive mode operation can utilize a similar mechanism as active mode. However, in passive mode, monitor 1200 might not inject probe packets into the routers comprised and/or defined by the MDT. Instead, monitor 1200 can passively receive and/or monitor actual customer traffic. Alternatively, in passive mode, monitor 1200 might continue to inject probe packets into the routers comprised and/or defined by the MDT, yet can filter and/or ignore those packets when received, and instead passively receive and/or monitor actual customer traffic. This method can be generalizable in that different sets of PE routers at different MDTs can be monitored simultaneously. Also, P routers 1510, 1520 can be monitored in addition to PE routers 1500, 1530, 1550.

Monitor 1200 can be adapted to send at least one join message, such as an IGMP join message, for a multicast group address to PE routers 1500, 1530, 1550. This message can be adapted to result in all multicast packets addressed to the group address and received at PE routers 1500, 1530, 1550 being transmitted and/or forwarded to monitor 1200. The join messages can be periodically and/or aperiodically retransmitted, such as via utilizing the IGMP protocol, to maintain a membership of monitor 1200 in the multicast group on specified virtual links.

In certain exemplary embodiments, monitor 1200 does not inject probe packets into the routers comprised and/or defined by the MDT. Instead, monitor 1200 can be adapted to transmit periodic ping packets, such as ICMP Echo Request packets, over virtual links to each of PE routers 1500, 1530, 1550. These ping packets can be transmitted via unicast, and the receiving router can immediately return an acknowledgement and/or reply, such as an ICMP Echo Reply via unicast routing to monitor 1200 utilizing the ICMP protocol. Thereby, monitor 1200 can monitor the packet loss rate and the round trip delay between itself and each of PE routers 1500, 1530, 1550.

Multicast packets received by PE routers 1500, 1530, 1550 for the group address can be transmitted and/or forwarded over the virtual link to monitor 1200. Monitor 1200 can identify a PE router from which it receives a packet using information provided by the virtual link technology (e.g., GRE). In passive mode, monitor 1200 might not have injected probe packets into the routers comprised and/or defined by the MDT. Rather packets monitored by monitor 1200 can be customer network packets received by some ingress PE router from an adjacent CE router and transmitted across the routers comprised and/or defined by the MDT. The ingress PE, (in this exemplary embodiment PE router 1500) having received packets sent from source CE router 1300, can be identified by the source address in the multicast packet received by monitor 1200.

Multiple copies of the same packet might be received from each of PE routers 1500, 1530, 1550 to which monitor 1200 has issued an IGMP join for the group address. The contents of these packets can be largely opaque to monitor 1200, and enough information might not be assumable to parse application level headers. However, monitor 1200 can be adapted to compare bit patterns in packets to identify multiple copies of the same packet. Thus, monitor 1200 might acquire enough information to identify an ingress PE router at which the packet first entered the provider network, egress PE routers it was received at, and a relative time difference between receipt at different PEs. Monitor 1200 can be adapted to adjust loss rates and delay for loss rate and delays as measured by unicast pings over virtual links. In addition, monitor 1200 can be adapted to measure a number and size of packets transmitted by the customer across the routers comprised and/or defined by the MDT to determine the total data rate across the routers comprised and/or defined by the MDT. The data collected by monitor 1200 can also be used for problem locations. That is, in both active and passive modes, by comparing a set of packets received at different PE routers 1500, 1530, 1550, it might be possible to determine at which MDT-defined router performance problems (e.g., packet loss) inside might be occurring.

This technique can also be applied to generic (non-VPN) IP multicasts. Monitor 1200 can be adapted to similarly utilize virtual link technology to connect to any multicast-enabled router in network 1100. Monitor 1200 can issue joins to such routers for any multicast group, passively receive traffic transmitted to this group and/or actively transmit its own probe traffic that monitor 1200 subsequently receives at the routers to which monitor 1200 has joined.

Figure 2:
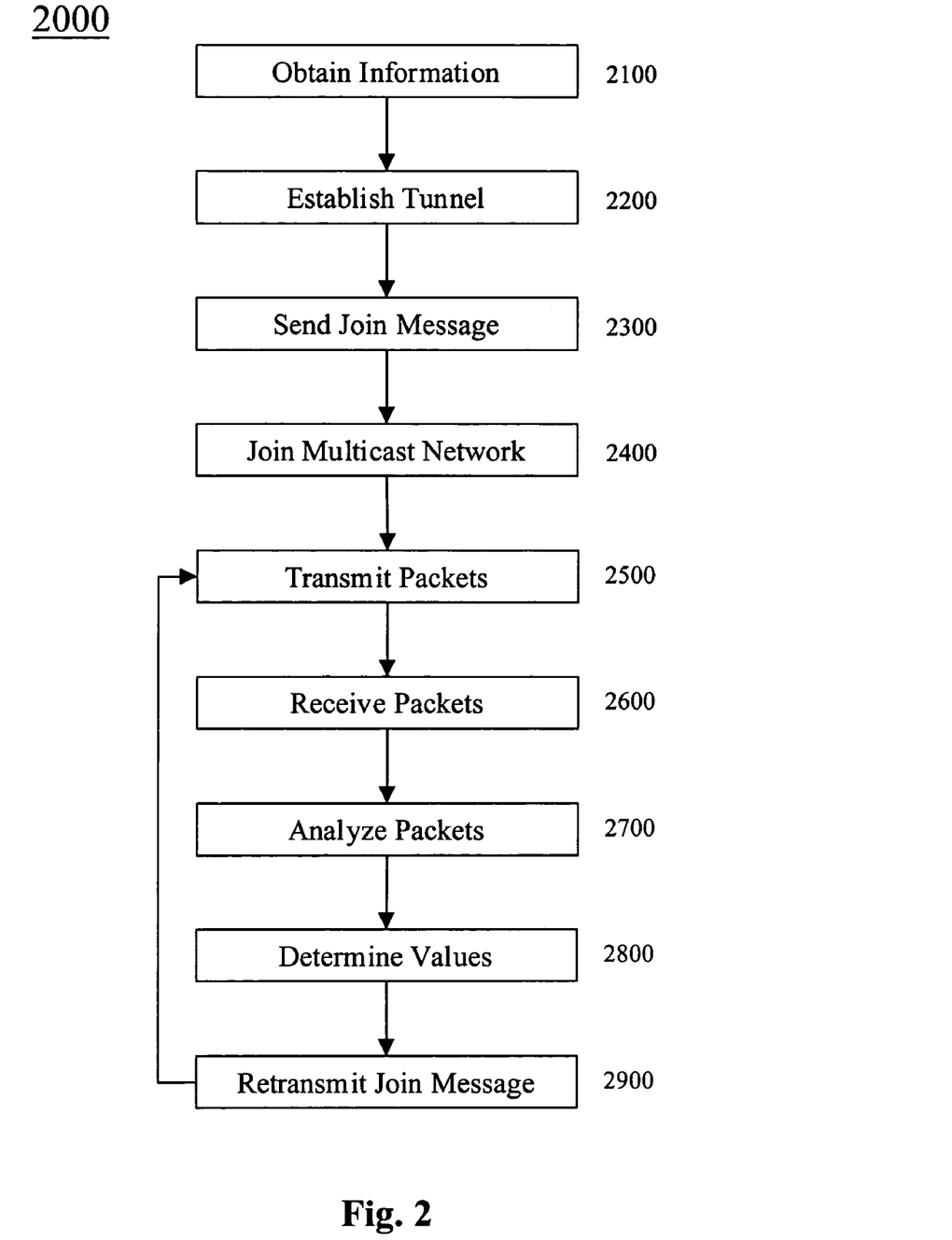
FIG. 2 is a block diagram of an exemplary embodiment of a method 2000.

FIG. 2 is a flowchart of an exemplary embodiment of a method 2000. At activity 2100 network information can be obtained. Network information can be obtained from information associated with one or more predetermined customers, predetermined external customer networks, MVPN's, router configuration files, and/or Provider Edge routers associated with one or more MVPN's, etc. The network information can comprise identities and/or addresses of routers, such as PE routers, associated with the MVPN. A monitor can be adapted to obtain and/or record information regarding a Multicast Distribution Tree associated with the MVPN.

At activity 2200, a tunnel can be established between the monitor and one or more Provider Edge routers. The tunnel can be implemented utilizing a known networking technology such as GRE encapsulation, IP-in-IP encapsulation, or ATM Virtual Circuits. The tunnel can be related to a Multicast Distribution Tree associated with the Multicast Virtual Private Network transmission.

At activity 2300, a monitor can send a join message to join the MVPN. The monitor can be in and/or associated with a backbone network. The join message can be an Internet Group Management Protocol join message to join a Multicast Virtual Private Network transmission.

At activity 2400, a monitor can join the Multicast Network and/or MVPN. Thus, packets sent to routers to which the monitor is coupled, such as via a tunnel, and/or for which the monitor is comprised by the multicast group address and/or address list, can be transmitted and/or copied to the monitor.

At activity 2500, packets can be transmitted by the monitor. In certain exemplary embodiments, a probe packet can be transmitted via the tunnel to a sending Provider Edge router.

The probe packet can comprise unicast encapsulation. The probe packet can comprise a source address of the monitor and a destination address comprising a multicast group address. The probe packet and/or the multicast group address can comprise and/or imply a monitor address so that the packet will be returned to the monitor. The probe packet can comprise information sufficient and/or adapted to identify the probe packet to the monitor.

In certain exemplary embodiments, the monitor can record a sending time of the probe packet. The probe packet can be adapted to be returned to the monitor via the at least one Provider Edge router. The monitor can record identifiers for each of a set of Provider Edge routers from which a response to the probe packet is expected. The probe packet can comprise and/or lack information adapted to cause the Provider Edge router not to forward the probe packet to a Customer Edge router.

In certain exemplary embodiments, the monitor can monitor connectivity between a sending Provider Edge router and a predetermined receiving Provider Edge router. The predetermined receiving Provider Edge router can be associated with the Multicast Virtual Private Network transmission.

The monitor can, via a first unicast, send an Internet Control Message Protocol Echo Request packet over a virtual link to the source Provider Edge router. Information obtained via the unicast can be adapted for use to determine a delay associated with the Multicast Virtual Private Network transmission.

The monitor can, via a second unicast, receive an Internet Control Message Protocol Echo Reply from a Provider Edge router, such as a source Provider Edge router.

At activity 2600, packets can be received at the monitor. For example, a plurality of copies of the probe packet can be received. Each of the plurality of copies of the probe packet can be forwarded and/or transmitted by a distinct Provider Edge router of a plurality of Provider Edge routers.

In certain exemplary embodiments, the monitor can be adapted to receive a plurality of customer network packets transmitted via the tunnel. The plurality of customer network packets can be from the Multicast Virtual Private Network transmission.

At activity 2700, packets can be analyzed. In certain exemplary embodiments, the monitor can be adapted to analyze returned probe packets to identify one or more Provider Edge routers associated with a route traversed by the probe packet. In certain exemplary embodiments, the monitor can be adapted to identify a particular Provider Edge router associated with a particular packet received via the Multicast Virtual Private Network transmission. The monitor can be adapted to identify an ingress Provider Edge router at which a particular packet, which can be associated with the Multicast Virtual Private Network transmission, first entered a Provider network. The monitor can be adapted to identify an egress Provider Edge router at which a particular packet, which can be associated with the Multicast Virtual Private Network transmission, exited a Provider network. Information regarding identified Provider Edge routers can be recorded on a memory device associated with the monitor.

The monitor can be adapted to record a time at which a forwarded probe packet is received from a particular Provider Edge router. The monitor can be adapted to measure a number and size of packets transmitted by a predetermined customer across the Multicast Distribution Tree to determine a total data rate across the Multicast Distribution Tree. Responsive to information obtained from one or more packets, the monitor can be adapted to locate a packet loss problem associated with the Multicast Virtual Private Network transmission.

At activity 2800, information, such as performance metrics, values, and/or status information can be determined. For example, a performance metric of a packet loss rate between the sending Provider Edge router and a predetermined receiving Provider Edge router can be determined. The packet loss rate can be associated with the Multicast Virtual Private Network transmission.

In certain exemplary embodiments, a performance metric of one-way delay between the sending Provider Edge router and a predetermined receiving Provider Edge router can be determined. For example, the one-way delay can be determined by subtracting a delay measured with a unicast ping from a calculated end-to-end delay measured via the monitor. The one-way delay can be associated with the Multicast Virtual Private Network transmission.

In certain exemplary embodiments, the monitor can be adapted to determine a performance metric of a round trip delay between the monitor and a predetermined Provider Edge router. The round trip delay can be associated with the Multicast Virtual Private Network transmission.

Responsive to a plurality of received customer network packets, the monitor can be adapted to determine a performance metric of a packet loss rate between the monitor and the at least one Provider Edge router. The packet loss rate can be associated with the Multicast Virtual Private Network transmission. Values determined by the monitor can be stored on an information device and/or rendered on an input/output device.

Information can be automatically reported, intermittently and/or continuously, from the monitor, such as via a syslog and/or XML feed, and/or via remote procedure calls, HTTP, and/or SOAP, etc. Such information can comprise statistics determined by the monitor. Thus, the monitor can provide automated, adaptive, surgical, closed loop, and/or dynamic reporting of the type, nature, amount, and/or portion, etc., of packets received by the monitor.

At activity 2900, the join message can be retransmitted periodically and/or aperiodically to maintain membership in the Multicast Virtual Private Network transmission. The join message can be retransmitted at predetermined time intervals.

Figure 3:
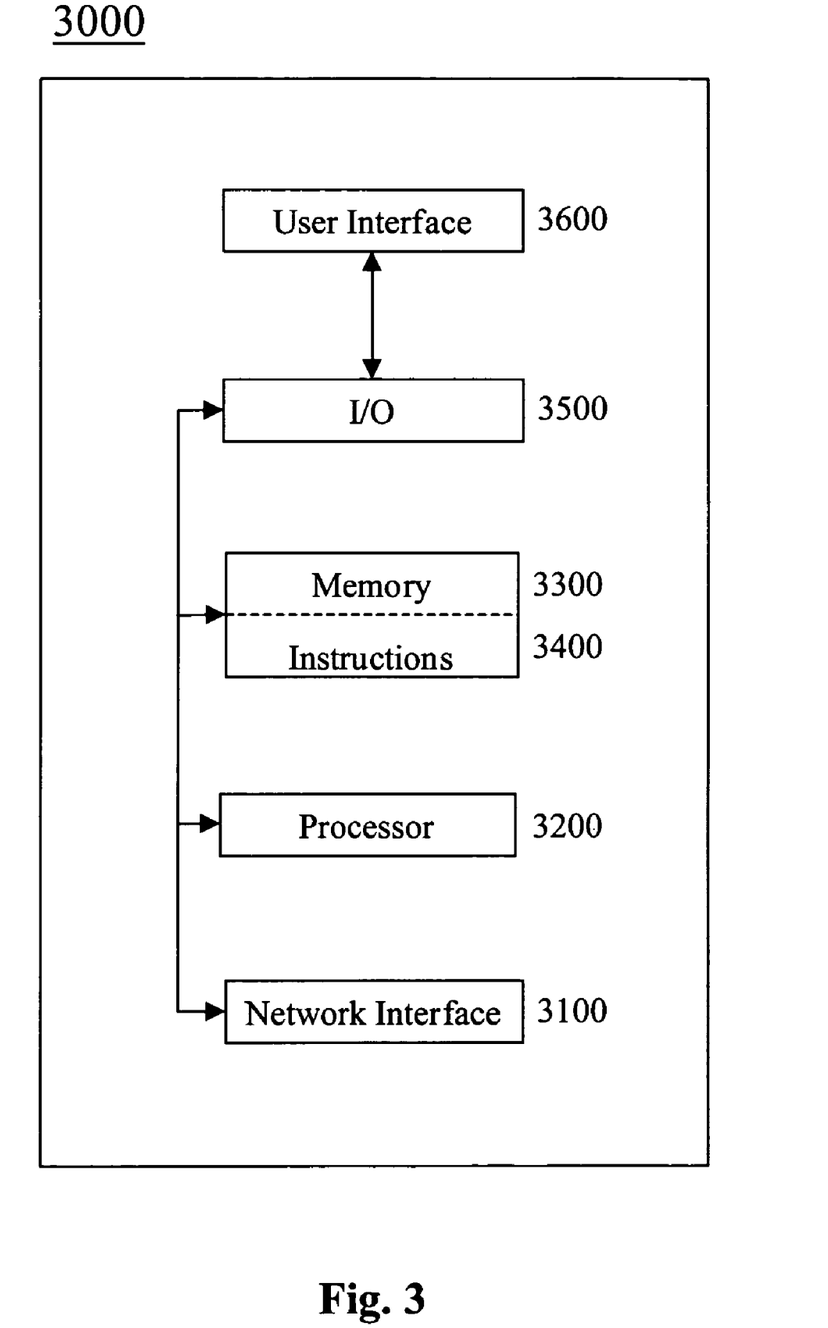
FIG. 3 is a block diagram of an exemplary embodiment of an information device 3000.

FIG. 3 is a block diagram of an exemplary embodiment of an information device 3000, which in certain operative embodiments can comprise, for example, monitor 1200; customer edge routers 1300, 1400, 1450; provider edge routers 1500, 1530, 1550; and provider routers 1510, 1520, 1540 of FIG. 1. Information device 3000 can comprise any of numerous components, such as for example, one or more network interfaces 3100, one or more processors 3200, one or more memories 3300 containing instructions 3400, one or more input/output (I/O) devices 3500, and/or one or more user interfaces 3600 coupled to I/O device 3500, etc.

In certain exemplary embodiments, via one or more user interfaces 3600, such as a graphical user interface, a user can view a rendering of information related to performance of a Multicast Virtual Private Network.

Still other practical and useful embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application.

Thus, regardless of the content of any portion (e.g., title, field, background, summary, abstract, drawing figure, etc.) of this application, unless clearly specified to the contrary, such as via an explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all subranges therein. Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

What is claimed is:

1. A method of monitoring a network comprising:

establishing at least one tunnel between a monitor in a backbone network and each of at least one of a plurality of provider edge routers, wherein the at least one tunnel is established by the monitor;

sending an internet group management protocol join message for a multicast group to the at least one of the plurality of provider edge routers via at least one tunnel of the at least one tunnel, wherein the multicast group is used by a multicast distribution tree of a multicast virtual private network, wherein the join message is sent by the monitor;

transmitting a probe packet via a predetermined tunnel of the at least one tunnel to an ingress provider edge router by utilizing the monitor, wherein the probe packet comprises a source address of the monitor and a destination address comprising a multicast group address of the multicast distribution tree, wherein the probe packet comprises identification information for enabling the monitor to identify the probe packet;

receiving at least one of the transmitted probe packet and a copy of the probe packet at the monitor from a provider edge router of the plurality of edge routers, wherein each of the transmitted probe packet and the copy of the probe packet comprises information for enabling the monitor to identify the provider edge router that transmitted at least one of the transmitted probe packet and the copy; and joining the monitor to the multicast group, wherein all multicast packets addressed to the multicast group and received at a particular provider edge router are sent to the monitor by an action selected from the group consisting of forwarding and copying, wherein the monitor is configured to identify at least one of the plurality of provider edge routers using information provided by generic routing encapsulation.

2. The method of claim 1, further comprising:
recording a sending time of the probe packet.

3. The method of claim 1, further comprising:
recording identifiers for each of a set of provider edge routers from which a copy of the probe packet is expected.

4. The method of claim 1, wherein sending the internet group management protocol join message comprises retransmitting the internet group management protocol join message to maintain membership in the multicast group.

5. The method of claim 1, further comprising:
monitoring connectivity between the ingress provider edge router and a predetermined egress provider edge router, wherein the predetermined egress provider edge router is associated with the multicast distribution tree, and wherein each multicast packet is encapsulated via generic routing encapsulation.

6. The method of claim 1, further comprising:
determining a packet loss rate between the ingress provider edge router and a predetermined egress provider edge router, wherein the packet loss rate is associated with the multicast distribution tree.

7. The method of claim 1, further comprising:
determining a delay from the ingress provider edge router to a predetermined egress provider edge router by subtracting a delay measured with a unicast ping from an end-to-end delay measured via the monitor, wherein the end-to-end delay is associated with the multicast distribution tree.

8. The method of claim 1, further comprising:
sending an internet control message protocol echo request over the one or more tunnels from the monitor to the ingress provider edge router; and
computing a one-way delay and a loss rate over the one or more tunnels responsive to a received internet control message protocol echo reply sent in response to internet control message protocol echo request.

9. The method of claim 1, further comprising:
sending an internet control message protocol echo request over the one or more tunnels from the monitor to an egress provider edge router; and
computing a one-way delay and a loss rate over the one or more tunnels responsive to a received internet control message protocol echo reply sent in response to internet control message protocol echo request.

10. The method of claim 1, wherein the monitor is configured to distinguish customer traffic from probe packets and ignore probe packets.

11. The method of claim 1, further comprising:
recording a provider edge router from which the probe packet is forwarded.

12. The method of claim 1, further comprising:
recording a time at which a forwarded probe packet is received from a provider edge router.

13. A method of monitoring a network comprising:
establishing one or more tunnels between a monitor located in a backbone network and each of at least one of a plurality of provider edge routers, wherein the one or more tunnels are established by the monitor;
sending an internet group management protocol join message for a multicast group to the at least one of the plurality of provider edge routers via at least one of the one or more tunnels, the multicast group used by a multicast distribution tree of a multicast virtual private network, wherein the join message is sent by the monitor;

transmitting probe packets to the plurality of provider edge routers;

receiving at the monitor a plurality of customer network packets via at least one of the one or more tunnels;

receiving at least one of the transmitted probe packets and copies of the probe packets from the plurality of provider edge routers;

determining a performance metric regarding multicast virtual private network transmission between at least a pair of the plurality of provider edge routers in response to receiving the plurality of customer network packets, wherein the determination is performed by the monitor; and joining the monitor to the multicast group, wherein all multicast packets addressed to the multicast group and received at a particular provider edge router are sent to the monitor by an action selected from the group consisting of forwarding and copying, and wherein the monitor is configured to identify one or more of the plurality of provider edge routers using information provided by generic routing encapsulation.

14. The method of claim 13, further comprising:

sending an internet control message protocol echo request over a virtual link to a provider edge router via a first unicast; and receiving an internet control message protocol echo reply from the at least one of the plurality of provider edge routers via a second unicast.

15. The method of claim 13, further comprising:

determining a round trip delay and loss rate between the monitor and a predetermined provider edge router, wherein all multicast packets addressed to the multicast group and received at a particular provider edge router are one of forwarded and copied to the monitor, and wherein the monitor is configured to distinguish customer traffic from the probe packets and discard customer traffic.

16. The method of claim 13, further comprising:

identifying a particular provider edge router associated with a particular packet received via the multicast distribution tree.

17. The method of claim 13, further comprising:

identifying an ingress provider edge router at which a particular packet first entered a provider network, the particular packet associated with the multicast distribution tree.

18. The method of claim 13, further comprising:

identifying an egress provider edge router at which a particular packet exits a provider network, the particular packet associated with the multicast distribution tree.

19. The method of claim 13, further comprising:

measuring a number and size of packets transmitted by a predetermined customer across the multicast distribution tree to determine a total data rate across the multicast distribution tree.

20. The method of claim 13, further comprising:

locating a packet loss problem associated with the multicast distribution tree.

* * * * *